United States Patent
Kawaguchi

(10) Patent No.: US 9,461,879 B2
(45) Date of Patent: Oct. 4, 2016

(54) APPARATUS AND METHOD FOR SYSTEM ERROR MONITORING

(71) Applicant: FUJITSU LIMITED, Kawasaki-shi, Kanagawa (JP)

(72) Inventor: Katsuaki Kawaguchi, Toyoake (JP)

(73) Assignee: FUJITSU LIMITED, Kawasaki (JP)

( * ) Notice: Subject to any disclaimer, the term of this patent is extended or adjusted under 35 U.S.C. 154(b) by 526 days.

(21) Appl. No.: 13/906,537

(22) Filed: May 31, 2013

(65) Prior Publication Data

US 2014/0006607 A1 Jan. 2, 2014

(30) Foreign Application Priority Data

Jul. 2, 2012 (JP) ................................ 2012-148552

(51) Int. Cl.
*H04L 12/24* (2006.01)
*H04L 12/26* (2006.01)
*H04L 12/751* (2013.01)

(52) U.S. Cl.
CPC ........... *H04L 41/0631* (2013.01); *H04L 41/06* (2013.01); *H04L 41/0604* (2013.01); *H04L 41/0695* (2013.01); *H04L 43/0823* (2013.01); *H04L 45/02* (2013.01)

(58) Field of Classification Search
CPC ........... G06F 11/0709; G06F 11/0727; G06F 11/3006; G06F 11/3495; G06F 17/30371; G06Q 10/06; G06Q 10/10; H04L 41/0886; H04L 41/06; H04L 41/0604; H04L 41/0631; H04L 41/0695; H04L 43/0823; H04L 45/02; H04N 21/44222

See application file for complete search history.

(56) References Cited

U.S. PATENT DOCUMENTS

| 7,568,019 | B1 * | 7/2009 | Bhargava | ............... G06Q 10/06 709/223 |
| 2003/0212928 | A1 * | 11/2003 | Srivastava | ......... G06F 11/0709 714/47.3 |

(Continued)

FOREIGN PATENT DOCUMENTS

| JP | 6-208694 | 7/1994 |
| JP | 2005-38125 A | 2/2005 |

(Continued)

OTHER PUBLICATIONS

Japanese Office Action issued Dec. 8, 2015 in Patent Application No. 2012-148552 (with partial unedited computer generated English translation).

*Primary Examiner* — Le H Luu
(74) *Attorney, Agent, or Firm* — Oblon, McClelland, Maier & Neustadt, L.L.P

(57) ABSTRACT

A disclosed monitoring method is executed by a computer. The monitoring method includes detecting an event occurred in a monitoring target; specifying data of an event which corresponds with the detected event, by searching a first storage storing at least data of an event, which occurred when maintenance on the monitoring target started, or data of an event, which occurred when the maintenance on the monitoring target ended; and outputting data indicating that the maintenance on the monitoring target started or ended when data of an event, which corresponds with the detected event, is specified.

8 Claims, 17 Drawing Sheets

(56) References Cited

U.S. PATENT DOCUMENTS

| | | | | |
|---|---|---|---|---|
| 2005/0198614 | A1* | 9/2005 | Mavashev | G06Q 10/10 717/102 |
| 2006/0064486 | A1* | 3/2006 | Baron | H04L 41/0886 709/224 |
| 2006/0075292 | A1* | 4/2006 | Fukui | G06F 11/0727 714/5.11 |
| 2007/0039049 | A1* | 2/2007 | Kupferman | G06F 11/3495 726/22 |
| 2007/0276780 | A1* | 11/2007 | Iriyama | G06Q 10/10 |
| 2012/0023221 | A1* | 1/2012 | Dayan | G06F 11/3006 709/224 |
| 2013/0066837 | A1* | 3/2013 | Colrain | G06F 17/30371 707/674 |
| 2014/0129942 | A1* | 5/2014 | Rathod | H04N 21/44222 715/720 |

FOREIGN PATENT DOCUMENTS

| | | |
|---|---|---|
| JP | 2008-217229 | 9/2008 |
| JP | 2011-215977 A | 10/2011 |

* cited by examiner

| APPLICATION | RECORDING |
|---|---|
| APPLICATION A | RECORDING IS IN PROGRESS |
| APPLICATION B | - |
| APPLICATION C | - |
| ⋮ | ⋮ |

| APPLICATION | START / END | NO. | EVENT |
|---|---|---|---|
| APPLICATION A | START | 1 | USER XXX LOGGED IN |
| | | 2 | stopJobA COMMAND WAS EXECUTED. |
| | | 3 | joba_daemon PROCESS STOPPED. |
| | END | 1 | USER XXX LOGGED IN |
| | | 2 | startJobA COMMAND WAS EXECUTED. |
| | | 3 | joba_daemon PROCESS STARTED. |
| ⋮ | ⋮ | ⋮ | ⋮ |

| NO. | DATE AND TIME OF OCCURRENCE | APPLICATION SERVER | APPLICATION | MESSAGE |
|---|---|---|---|---|
| ... | ... | ... | ... | ... |
| 1 | 02/06 10:00:00 | SERVER A | APPLICATION A | CPU UTILIZATION OF PROCESS A IS.... |
| 2 | 02/06 10:00:00 | SERVER A | APPLICATION A | USER (jobAadmin) LOGGED IN. |
| 3 | 02/06 10:00:02 | SERVER A | APPLICATION A | COMMAND FOR STOPPING APPLICATION A (PROCESS A1,A2,A3) WAS EXECUTED. |
| 4 | 02/06 10:00:02 | SERVER A | APPLICATION A | APPLICATION A STOPPED. |
| ... | ... | ... | ... | ... |

FIG.5

| NO. | DATE AND TIME OF OCCURRENCE | APPLICATION SERVER | APPLICATION | MESSAGE | FLAG |
|---|---|---|---|---|---|
| ... | ... | ... | ... | ... | ... |
| 1 | 02/06 10:00:00 | SERVER A | APPLICATION A | CPU UTILIZATION OF PROCESS A1 IS ... | |
| 2 | 02/06 10:00:00 | SERVER A | APPLICATION A | USER (jobAadmin) LOGGED IN. | |
| 3 | 02/06 10:00:02 | SERVER A | APPLICATION A | COMMAND FOR STOPPING APPLICATION A (PROCESS A1,A2,A3) WAS EXECUTED. | |
| 4 | 02/06 10:00:02 | SERVER A | APPLICATION A | APPLICATION A STOPPED. | FIRST |
| ... | ... | ... | ... | ... | ... |

FIG.8

| NO. | DATE AND TIME OF OCCURRENCE | EVENT |
|---|---|---|
| ⋮ | ⋮ | ⋮ |
| 2 | 02/06 10:00:00 | SERVER A USER (jobAadmin) LOGGED IN. |
|   | 02/06 10:00:02 | SERVER A COMMAND FOR STOPPING APPLICATION A (PROCESS A1,A2,A3) WAS EXECUTED. |
|   | 02/06 10:00:02 | SERVER A APPLICATION A STOPPED. |
| ⋮ | ⋮ | ⋮ |

FIG.9

| APPLICATION | MONITORING |
|---|---|
| APPLICATION A | MONITORING IS IN PROGRESS |
| APPLICATION B | - |
| APPLICATION C | MONITORING IS IN PROGRESS |
| ⋮ | ⋮ |

FIG.10

| APPLICATION | FLAG |
|---|---|
| APPLICATION A | - |
| APPLICATION B | SECOND |
| APPLICATION C | FIRST |
| ⋮ | ⋮ |

FIG.11

| | | | |
|---|---|---|---|
| 1 | 02/06 10:00:00 | SERVER A | APPLICATION A | CPU UTILIZATION OF PROCESS A1 IS ... |
| 2 | 02/06 10:10:00 | SERVER A | APPLICATION A | THERE IS A POSSIBILITY THAT MAINTENANCE OF APPLICATION A HAS STARTED. |
| 3 | 02/06 10:20:00 | SERVER A | APPLICATION A | PROCESS A1 IS STOPPED. |
| 4 | 02/06 10:30:00 | SERVER A | APPLICATION B | PROCESS B1 IS STOPPED. |
| 5 | 02/06 10:40:00 | SERVER A | APPLICATION A | PROCESS A2 IS STOPPED. |
| 6 | 02/06 10:50:00 | SERVER B | APPLICATION A | PROCESS A3 IS STOPPED. |

FIG.15

| | | | |
|---|---|---|---|
| 1 | 02/06 11:00:00 | SERVER A | APPLICATION B | CPU UTILIZATION OF PROCESS B1 IS .... |
| 2 | 02/06 11:10:00 | SERVER A | APPLICATION A | THERE IS A POSSIBILITY THAT MAINTENANCE OF APPLICATION A HAS ENDED. |
| 4 | 02/06 11:20:00 | SERVER A | APPLICATION B | PROCESS B1 IS STOPPED. |

FIG.16

| 1 | 02/06 10:00:00 | SERVER A | APPLICATION A | CPU UTILIZATION OF PROCESS A1 IS ··· |
|---|---|---|---|---|
| 2 | 02/06 10:10:00 | SERVER A | APPLICATION A | THERE IS A POSSIBILITY THAT MAINTENANCE OF APPLICATION A HAS STARTED. |
| 3 | 02/06 10:00:00 | SERVER A | | USER (jobAadmin) LOGGED IN. |
| 4 | 02/06 10:00:02 | SERVER A | | COMMAND FOR STOPPING APPLICATION A (PROCESS A1,A2,A3) WAS EXECUTED. |
| 5 | 02/06 10:00:02 | SERVER A | | APPLICATION A STOPPED. |
| 6 | | | | |

| APPLICATION A | SERVER A | PROCESS A1 |
| --- | --- | --- |
| | | PROCESS A2 |
| | SERVER B | PROCESS A3 |
| APPLICATION B | SERVER A | PROCESS B1 |
| | SERVER B | PROCESS B2 |

FIG.19

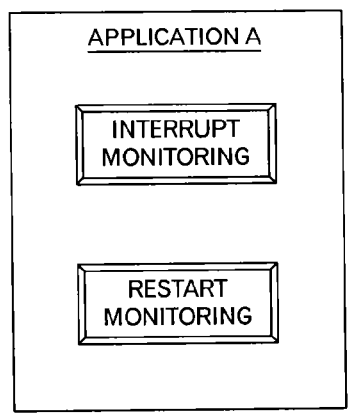

FIG.20

| 1 | 02/06 11:00:00 | SERVER A | APPLICATION B | CPU UTILIZATION OF PROCESS B1 IS ··· |
| --- | --- | --- | --- | --- |
| 2 | 02/06 11:10:00 | SERVER A | APPLICATION A | THERE IS A POSSIBILITY THAT MAINTENANCE OF APPLICATION A HAS |
| 4 | 02/06 11:10:00 | SERVER A | | USER (jobAadmin) LOGGED IN. |
| | 02/06 11:10:02 | SERVER A | | COMMAND FOR STOPPING APPLICATION A (PROCESS A1,A2,A3) WAS EXECUTED. |
| | 02/06 11:10:02 | SERVER A | | APPLICATION A STARTED. |

FIG.22

| 1 | 02/06 10:00:00 | SERVER A | APPLICATION A | CPU UTILIZATION OF PROCESS A1 IS ··· |
| 2 | 02/06 10:10:00 | SERVER A | APPLICATION A | THERE IS A POSSIBILITY THAT MAINTENANCE OF APPLICATION A HAS STARTED. |
| 3 | 02/06 10:20:00 | SERVER A | APPLICATION A | PROCESS A1 IS STOPPED. |
| 4 | 02/06 10:30:00 | SERVER A | APPLICATION B | PROCESS B1 IS STOPPED. |
| 5 | 02/06 10:40:00 | SERVER A | APPLICATION A | PROCESS A2 IS STOPPED. |
| 6 | 02/06 10:50:00 | SERVER B | APPLICATION A | PROCESS A3 IS STOPPED. |

| | | | |
|---|---|---|---|
| 1 | 02/06 11:00:00 | SERVER A | APPLICATION B | CPU UTILIZATION OF PROCESS B1 IS .... |
| 2 | 02/06 11:10:00 | SERVER A | APPLICATION A | THERE IS A POSSIBILITY THAT MAINTENANCE OF APPLICATION A HAS ENDED. |
| 3 | 02/06 11:10:00 | SERVER A | APPLICATION A | PROCESS A1 IS STOPPED. |
| 4 | 02/06 11:20:00 | SERVER A | APPLICATION B | PROCESS B1 IS STOPPED. |
| 5 | 02/06 11:30:010 | SERVER A | APPLICATION A | PROCESS A2 IS STOPPED. |

FIG.26

APPARATUS AND METHOD FOR SYSTEM ERROR MONITORING

CROSS-REFERENCE TO RELATED APPLICATIONS

This application is based upon and claims the benefit of priority of the prior Japanese Patent Application No. 2012-148552, filed on Jul. 2, 2012, the entire contents of which are incorporated herein by reference.

FIELD

This invention relates to a technique for monitoring an error in a system.

BACKGROUND

In regards to a technique for monitoring whether there is an error in a machine or the like, there is a problem that an alarm sounds regardless of an actual error when maintenance on a machine in operation is performed. As to this problem, a technique is known for distinguishing whether the machine or the like is under maintenance. For example, by preparing in advance a file that records whether or not maintenance is being performed on a machine and using that file, it is possible to distinguish between a change of the state in a machine under maintenance and an error occurred in a normal machine. However, in this technique, it is not possible to handle cases such as when update of a file is neglected, or when for some unavoidable reason maintenance starts before the file is updated.

There is also a technique that determines, based on a state of a connection with a maintenance terminal, whether or not a machine is under maintenance. However, this technique can only be applied to a maintenance system that uses a maintenance terminal.

In other words, there is no technique for notifying start or end of maintenance.

SUMMARY

A monitoring method of one aspect includes: detecting an event occurred in a monitoring target; specifying data of an event which corresponds with the detected event, by searching a first storage storing at least data of an event, which occurred when maintenance on the monitoring target started, or data of an event, which occurred when the maintenance on the monitoring target ended; and outputting data indicating that the maintenance on the monitoring target started or ended when data of an event, which corresponds with the detected event, is specified.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram depicting an example of data stored in the recording data storage unit;

FIG. 8 is a diagram depicting an example of data stored in the event data storage unit;

FIG. 9 is a diagram depicting an example of data stored in the evidence data storage unit;

FIG. 10 is a diagram depicting an example of data stored in the monitoring state data storage unit;

FIG. 11 is a diagram depicting an example of data stored in the flag storage unit;

FIG. 15 is a diagram depicting an example of data displayed on the display of the monitoring client;

FIG. 16 is a diagram depicting an example of data displayed on the display of the monitoring client;

FIG. 19 is a diagram depicting an example of data displayed on the display of the monitoring client;

FIG. 20 is a diagram depicting an example of a screen for selecting interrupting or restarting monitoring;

FIG. 22 is a diagram depicting an example of data displayed on the display of the monitoring client;

FIG. 26 is a diagram depicting an example of data displayed on the display of the monitoring client;

DESCRIPTION OF EMBODIMENTS

Figure 1:
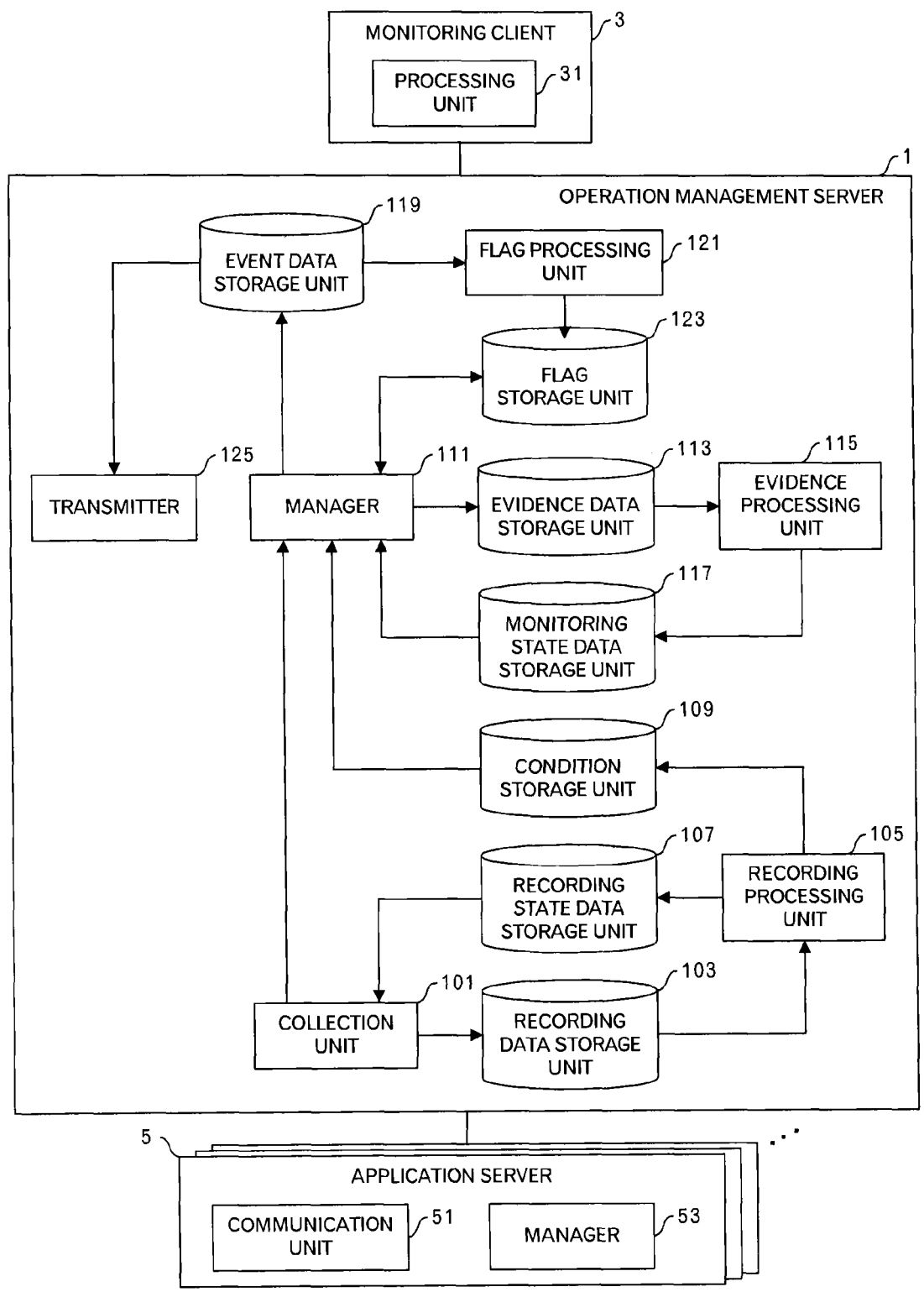
FIG. 1 is a diagram depicting a system outline of embodiments.

FIG. 1 illustrates a system of this embodiment. An operation management server 1 that performs the main processing for this embodiment is connected to plural application servers 5, which are the object of monitoring, and a monitoring client 3 that is operated by a user that monitors errors in the application servers 5.

An application server 5 includes a communication unit 51 and a manager 53.

The manager 53 in the application server 5 gathers data of events that occur in the application server 5, and outputs that data to the communication unit 51. The data of events includes, for example, information about users that login to the application server 5, execution log of commands, information about operating status of a process, information related to performance of the application server 5, and other logs. The communication unit 51 transmits event data received from the manager 53 to the operation management server 1 periodically or each time when an event occurs.

The operation management server 1 includes a collection unit 101, a recording data storage unit 103, a recording processing unit 105, a recording state data storage unit 107, a condition storage unit 109, a manager 111, an evidence data storage unit 113, an evidence processing unit 115, a monitoring state data storage unit 117, an event data storage unit 119, a flag processing unit 121, a flag storage unit 123 and a transmitter 125.

The collection unit 101 receives data of an event from an application server 5, and outputs that data to the manager 111. The collection unit 101 also determines recording state based on data that is stored in the recording state data storage unit 107. When the state is "recording is in progress", the collection unit 101 stores the received event data in the recording data storage unit 103.

When it is detected that the user of the monitoring client 3 has selected a "recording start button" or a "recording end button", the recording processing unit 105 updates the data that is stored in the recording state data storage unit 107. The recording processing unit 105 also uses the data that is stored in the recording data storage unit 103 to generate a starting condition and an ending condition, and stores those conditions in the condition storage unit 109.

The manager 111 performs processing based on data that is stored in the condition storage unit 109, data that is stored in the monitoring state data storage unit 117, data that is stored in the flag storage unit 123, and data of an event that is received from the collection unit 101, and stores processing results in the event data storage unit 119 and evidence data storage unit 113.

When there is a request for data of an event by which it was determined that maintenance started or ended (hereafter, referred to as an evidence event), the evidence processing unit 115 uses data that is stored in the evidence data storage unit 113 to generate data for presenting the evidence event to the user, and transmits the generated data to the monitoring client 3.

When there is a request for display contents when monitoring is interrupted or restarted, the flag processing unit 121 uses data that is stored in the event data storage unit 119 to generate data that represents the display contents when the monitoring is interrupted or restarted, and transmits that data to the monitoring client 3. Moreover, when an update request for updating a flag is received from the monitoring client 3, the flag processing unit 121 updates data that is stored in the flag storage unit 123.

The transmitter 125 uses data of an event that is stored in the event data storage unit 119 to generate display data to be displayed on a display (for example, a monitor) of the monitoring client 3, and transmits that data to the monitoring client 3.

The monitoring client 3 includes a processing unit 31.

When an instruction is received from a user, the processing unit 31 notifies the operation management server 1 of that instruction. When the processing unit 31 receives data to be displayed on the display from the operation management server 1, the processing unit 31 displays that data on the display.

Next, an operation of the system that is illustrated in FIG. 1 will be explained. First, processing of transmitting data of an event that occurred in the application server 5 to the monitoring client 3 will be explained.

Figures 2, 4:
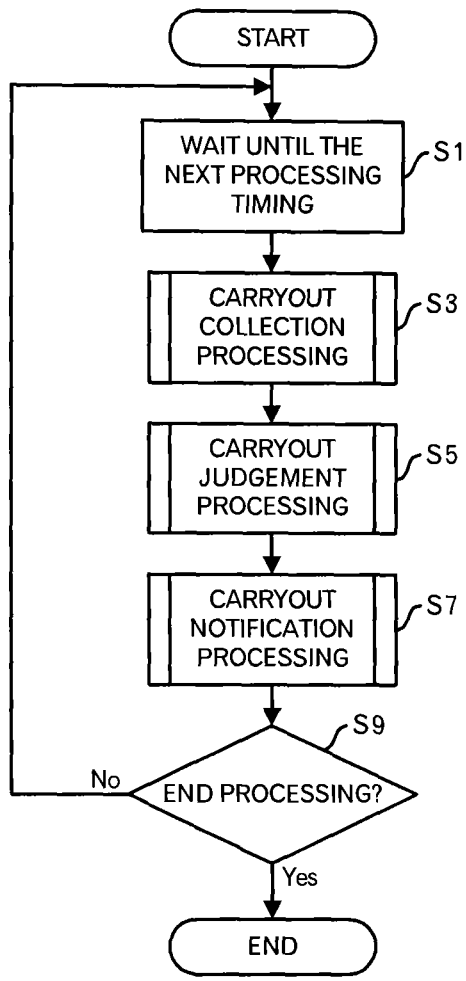
FIG. 2 is a diagram depicting a main processing flow in the embodiment.
FIG. 4 is a diagram depicting an example of data stored in the recording state data storage unit.

First, the collection unit 101 in the operation management server 1 waits until the next timing of processing (FIG. 2: step S1). In step S1, when, for example, the operation management server 1 performs a processing at specified time intervals, the collection unit 101 waits until a specified amount of time has elapsed since the previous processing was performed.

The collection unit 101 performs the collection processing at the next timing of processing (step S3). The collection processing will be explained by using FIG. 3 to FIG. 5.

First, the collection unit 101 receives data of an event that includes information for identifying an application from an application server 5 (FIG. 3: step S11), and outputs that data to the manager 111. The data received in step S11 also includes date and time of occurrence of the event, identification information for identifying an application server where the event occurred, and contents about the event that occurred.

For an application that is identified by the identification information for an application that is included in the data of an event, the collection unit 101 uses data that is stored in the recording state data storage unit 107 to determine whether the recording state is "recording is in progress" (step S13).

FIG. 4 illustrates an example of data that is stored in the recording state data storage unit 107. In the example in FIG. 4, identification information for identifying an application, and information for representing whether recording is in progress or not are stored.

When "recording is in progress" (step S13: YES route), the collection unit 101 stores the data of an event that was received in step S11 in the recording data storage unit 103 (step S15). Processing returns to the calling-source processing.

FIG. 5 illustrates an example of data that is stored in the recording data storage unit 103. In the example in FIG. 5, numbers for identifying events, date and time of occurrence of events, identification information for application servers, identification information for applications, and messages that represent contents of events that occurred are stored.

Figures 3, 7:
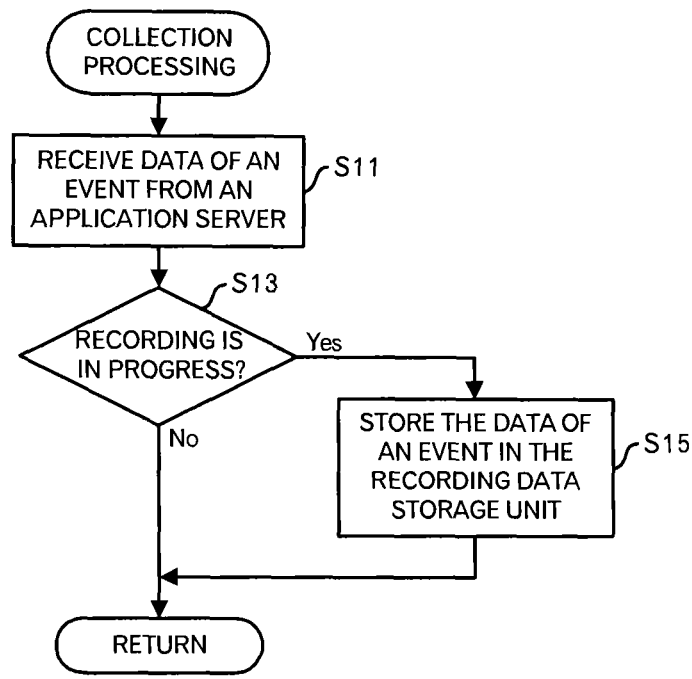
FIG. 3 is a diagram depicting a processing flow of a collection processing.
FIG. 7 is a diagram depicting an example of data stored in the condition storage unit.

Returning to the explanation of FIG. 3, when the recording state is not "recording is in progress" (step S13: NO route), processing returns to the calling-source processing.

In this way, data of events that occurred in each application is collected.

Returning to the explanation of FIG. 2, the operation management server 1 performs judgment processing (step S5). This judgment processing will be explained in FIG. 6 to FIG. 13. In step S11, when the received data includes data of plural events, the judgment processing is performed for each of the plural events.

Figure 6:
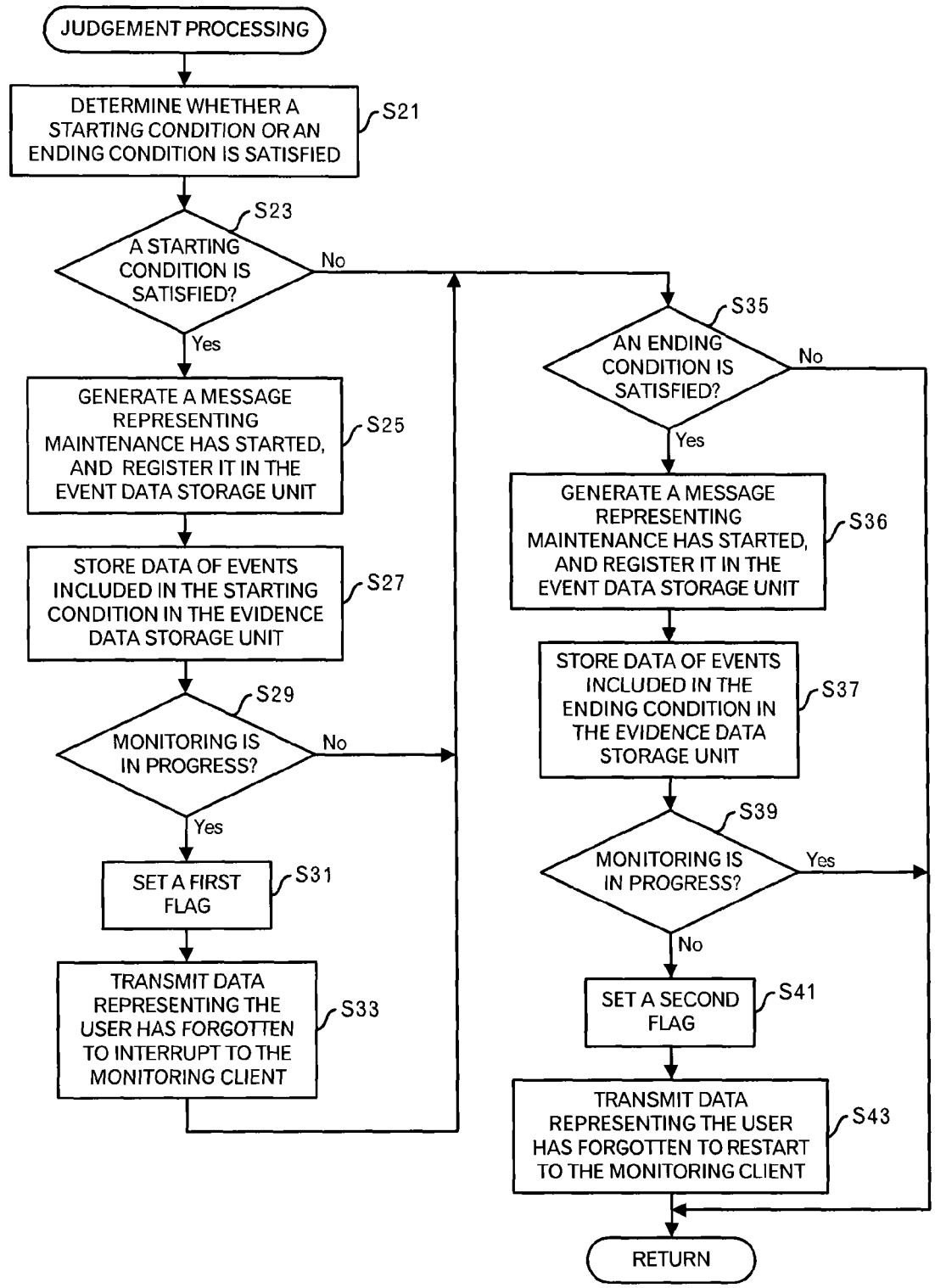
FIG. 6 is a diagram depicting a processing flow of a judgment processing.

First, the manager 111 uses the data of an event that was received in step S11 (hereafter, referred to as event data that is the object of processing) and data that is stored in the condition storage unit 109 to determine whether a starting condition or an ending condition for maintenance is satisfied (FIG. 6: step S21).

FIG. 7 illustrates an example of data that is stored in the condition storage unit 109. In the example in FIG. 7, identification information for an application, information that represents whether a condition is a starting condition or an ending condition, a number of occurrence of an event, and content of an event are stored.

In step S21, with a method such as following, it is determined whether a starting condition or an ending condition is satisfied. More specifically, (1) it is determined whether an event the flag of which is not set and which is the earliest event in order (event with the least number), of the events included in each starting conditions and each ending conditions, coincides with the event that is the object of processing. Then, (2) when that event coincides with the event that is the object of processing, a flag is set for that event. Each time that the processing in step S21 is executed, (1) and (2) are executed. As a result, when flags are set for all of the events that are included in a starting condition or an ending condition, it is determined that the starting condition or the ending condition is satisfied.

By doing so, it becomes possible to effectively determine whether a starting condition or an ending condition is satisfied.

Returning to the explanation in FIG. 6, when none of the starting conditions are satisfied (step S23: NO route), processing moves to the processing of step S35.

On the other hand, when one of the starting conditions is satisfied (step S23: YES route), the manager 111 generates a message representing that maintenance has started, and registers the message in the event data storage unit 119 (step S25). In step S25, the manager 111, for example, generates a message "There is a possibility that maintenance has started".

FIG. 8 illustrates an example of data that is stored in the event data storage unit 119. In the example in FIG. 8, numbers for identifying events, date and time of the occurrence of events, identification information for application servers, identification information for applications, messages representing the contents of events that occurred, and flags are stored. The flags will be explained later.

The manager 111 reads out data of events, which is included in the starting conditions determined to be satisfied in step S23, from the condition storage unit 109, and stores that data in the evidence data storage unit 113 (step S27).

FIG. 9 illustrates an example of data that is stored in the evidence data storage unit 113. In the example in FIG. 9, numbers for identifying combinations of evidence events, date and time of occurrence of events, and contents of events are stored.

The manager 111 determines, based on the data that is stored in the monitoring state data storage unit 117, whether the application in which the event that is the object of processing occurred is being monitored (step S29).

FIG. 10 illustrates an example of data that is stored in the monitoring state data storage unit 117. In the example in FIG. 10, identification information for applications and information indicating whether or not an application is being monitored are stored. Here, "monitoring is in progress" represents that the user of the monitoring client 3 is monitoring an event that occurred in that application (in other words, the monitoring client 3 has received the data of the event).

When an event is not being monitored (step S29: NO route), processing moves to the processing in step S35.

On the other hand, when an event is being monitored (step S29: YES route), the manager 111 sets a first flag in the flag storage unit 123 for the application that is the object of processing (step S31).

FIG. 11 illustrates an example of data that is stored in the flag storage unit 123. In the example in FIG. 11, identification information for applications and flags are stored. The first flag represents that monitoring is not interrupted even though maintenance is being performed. The second flag represents that monitoring was not restarted even though maintenance is not being performed.

The manager 111 transmits data representing that the user has forgotten to interrupt to the monitoring client 3 (step S33).

Figure 12:
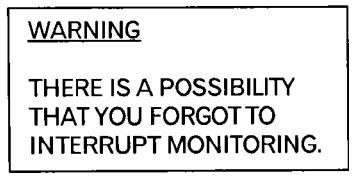
FIG. 12 is a diagram depicting an example of data displayed on a display of the monitoring client.

Accordingly, data such as illustrated in FIG. 12 is displayed on a display of the monitoring client 3. Such a display makes it possible for the user to notice that the user forgot to interrupt monitoring, so it is possible, for example, to recognize that even though trouble occurs in an application being monitored, that trouble may have occurred due to maintenance.

In the processing of step S61 that will be explained later, it is possible to notify the user with a message that represents that maintenance has started, so it is not absolutely necessary for step S33 to be performed.

Moving on to an explanation of step S35, the manager ill determines whether one of ending conditions has been met (step S35). When anyone of ending conditions has not been met (step S35: NO route), processing returns to the calling-source processing.

On the other hand, when one of ending conditions has been met (step S35: YES route), the manager 111 generates a message that represents that maintenance has ended, and registers that message in the event data storage unit 119 (step S36). In step S36, a message such as "There is a possibility that maintenance has ended." is generated.

The manager 111 reads out data of an event, which is included in the ending condition determined to be satisfied in step S35, from the condition storage unit 109. And the manager 111 stores that data in the evidence data storage unit 113 (step S37).

The manager 111 determines, based on data stored in the monitoring state data storage unit 117, whether the application in which the event that is the object of processing occurred is being monitored (step S39).

When the application is being monitored (step S39: YES route), processing returns to the calling-source processing.

On the other hand, when the application is not being monitored (step S39: NO route), the manager 111 sets the second flag for the application that is the object of processing in the flag storage unit 123 (step S41).

The manager 111 then transmits data to the monitoring client 3, wherein the data represents that restarting monitoring was forgotten (step S43). Processing then returns to the calling-source processing.

Figure 13:
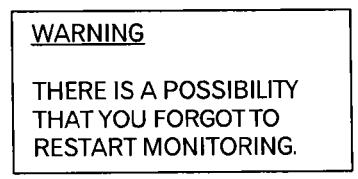
FIG. 13 is a diagram depicting an example of data displayed on the display of the monitoring client.

Data such as illustrated in FIG. 13 is displayed on the display of the monitoring client 3. This kind of display makes it possible for the user to notice that the user forgot to restart monitoring, so it is possible to avoid overlooking trouble that occurred in the application server 5 that is the object of monitoring.

In the processing of step S61 that will be explained later, it is possible to notify the user with a message that represents that maintenance has ended, so it is not absolutely necessary for the processing of step S43 to be performed.

Returning to the explanation of FIG. 2, the operation management server 1 performs notification processing (step S7). This notification processing will be explained using FIG. 14 to FIG. 16.

Figure 14:
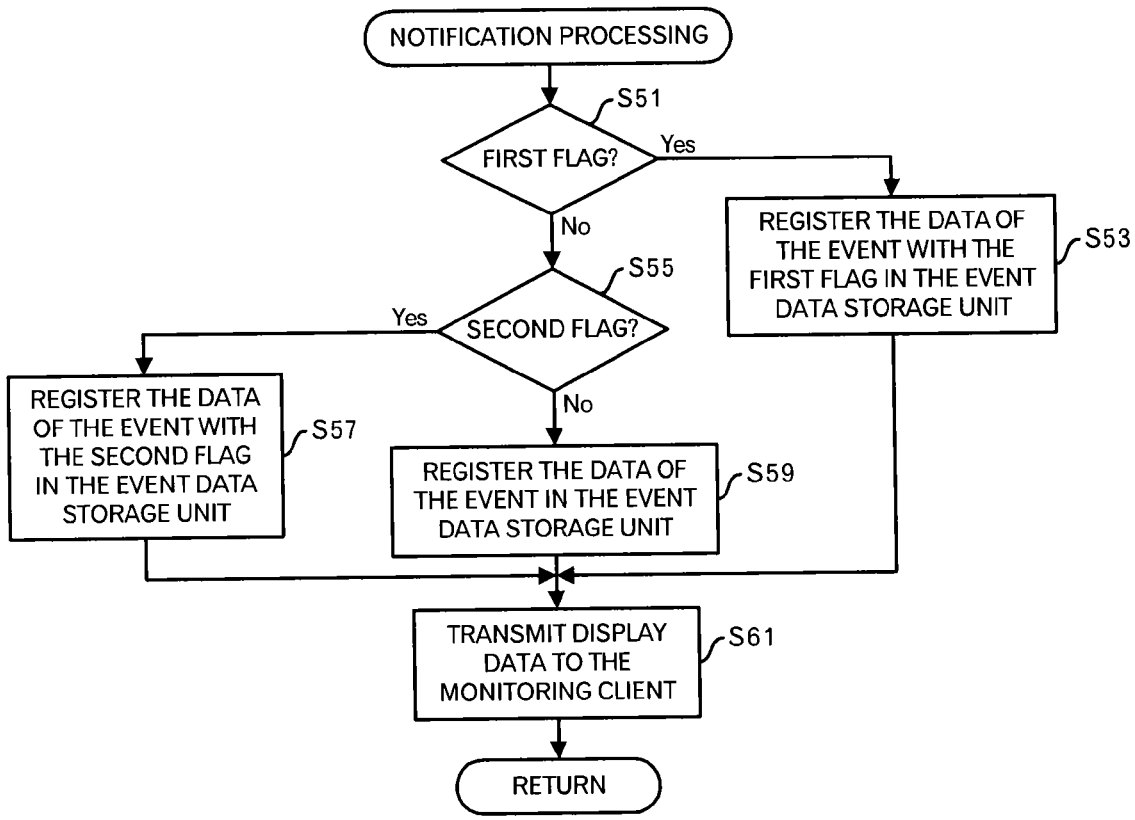
FIG. 14 is a diagram depicting a processing flow of a notification processing.

First, the manager 111 determines whether the first flag has been set in the flag storage unit 123 for the application that is the object of processing (FIG. 14: step S51).

When the first flag has been set (step S51: YES route), the manager 111 registers the data of the event that is the object of processing together with the first flag in the event data storage unit 119 (step S53). Processing then moves to the processing of step S61. By doing so, events that occur while the first flag is set in the flag storage unit 123 become associated with the first flag.

On the other hand, when the first flag is not set (step S51: NO route), the manager 111 determines whether the second flag has been set in the flag storage unit 123 for the application that is the object of processing (step S55).

When the second flag has been set (step S55: YES route), the manager 111 registers data of the event that is the object of processing together with the second flag in the event data storage unit 119 (step S57). Processing then moves to the processing in step S61. By doing so, events that occur while the second flag is set in the flag storage unit 123 will be associated with the second flag.

On the other hand, when the second flag is not set (step S55: NO route), the manager 111 registers the data of the event that is the object of processing in the event data storage unit 119 (step S59).

The transmitter 125 uses data that is stored in the event data storage unit 119 to generate display data for displaying events that occur in an application that is being monitored by the user of the monitoring client 3, and transmits that display data to the monitoring client 3 (step S61). Processing then returns to the calling-source processing.

In step S61, the application that is being monitored by the user of the monitoring client 3 can be identified by data that is stored in the monitoring state data storage unit 117. Moreover, in step S61, data of an event to which the second flag is set is not used in generating display data.

FIG. 15 illustrates an example of display data that is displayed on the display of the monitoring client 3. In the example in FIG. 15, events that occurred in applications A and B that the user of the monitoring client 3 is monitoring are displayed. The message "There is a possibility that maintenance of application A has started." is the message that was generated in step S25. The user checks this kind of message and takes necessary measures such as interrupting monitoring.

FIG. 16 illustrates another example of display data that is displayed on the display of the monitoring client 3. In the example in FIG. 16, events that occurred in applications A and B that are monitored by the user of the monitoring client 3 are displayed. The message "There is a possibility that maintenance of application A has ended." is the message that was generated in step S36. The user checks this kind of message and takes necessary measures such as restarting monitoring.

Returning to the explanation of FIG. 2, the operation management server 1 determines whether processing is to be ended (step S9). For example, when there was an instruction from the user of the operation management server 1 or the monitoring client 3 to end processing, it is determined to end processing. When processing is not to be ended (step S9: NO route), processing returns to the processing in step S1 in order to perform the next process. Otherwise, processing ends (step S9: YES route).

By performing processing such as described above, the user is able to know whether or not maintenance is being performed on the application server that is the object of monitoring. Therefore, even in the case where trouble occurs in the application being monitored, it is possible to determine whether or not the trouble is due to maintenance. Moreover, if the user knows that the trouble is due to maintenance, it is possible to avoid taking unnecessary measures.

Next, FIG. 17 to FIG. 20 will be used to explain processing that is performed by the operation management server 1 when the user clicks the left mouse button to select the portion "There is a possibility that maintenance of application A has started." in FIG. 15.

The processing unit 31 of the monitoring client 3 detects that the portion "There is a possibility that maintenance of application A has started." was selected by the user's left click of the mouse. As a result, the processing unit 31 transmits notification data to the operation management server 1 in order to notify that aforementioned portion was selected. The notification data includes a number for identifying a combination of evidence events.

Figures 17, 18:
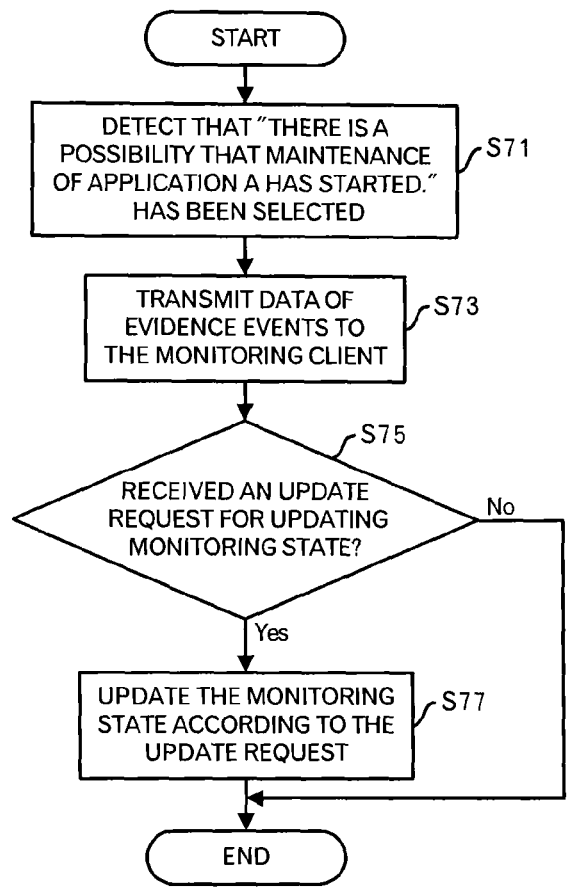
FIG. 17 is a diagram depicting a processing flow of a processing to present data of an evidence event to an user of monitoring client.
FIG. 18 is a diagram depicting an example of data displayed on the display of the monitoring client.

The evidence processing unit 115 of the operation management server 1 detects that "There is a possibility that maintenance of application A has started." has been selected by receiving aforementioned notification data from the monitoring client 3 (FIG. 17: step S71).

The evidence processing unit 115 uses a number, which is included in the received notification data for identifying a combination of evidence events, as a key and extracts data of an event from the evidence data storage unit 113. The evidence processing unit 115 then generates display data that includes the extracted data of the event, and transmits that display data to the monitoring client 3 (step S73).

The processing unit 31 of the monitoring client 3 displays the display data received from the operation management server 1 on the display. FIG. 18 illustrates an example of display data that is displayed on the display of the monitoring client 3. In the example in FIG. 18, near the message "There is a possibility that maintenance of application A has started.", data of the event, which is the evidence by which it was determined that maintenance of application A started, is displayed. Moreover, data of events whose number is other than "2" is grayed out, so the user can easily know by looking at the display which portion requires attention.

The user of the monitoring client 3, by way of a display such as illustrated in FIG. 19, is able to check which application is currently being monitored. In the example in FIG. 19, identification information for applications, identification information for application servers that are in charge of processing for the applications, and identification information for processes in an application server are displayed.

When the user of the monitoring client 3 determines, after checking the display such as in FIG. 18 and FIG. 19, that monitoring should be interrupted, the user then causes a display such as in FIG. 20 to be displayed. In FIG. 20, the display includes a button for giving an instruction to interrupt monitoring and a button for giving an instruction to restart monitoring for application A. The user left-clicks the button "interrupt monitoring". As a result, the processing unit 31 transmits an update request for updating monitoring state to the operation management server 1. The update request specifies an application for which the monitoring state is to be updated.

Returning to the explanation of FIG. 17, the evidence processing unit 115 determines whether an update request for updating monitoring state has been received from the monitoring client 3 (step S75). When an update request for updating monitoring state has not been received (step S75: NO route), processing ends.

On the other hand, when an update request for updating monitoring state is received (step S75: YES route), the evidence processing unit 115 updates the monitoring state for the application that is specified in the update request from "monitoring is in progress" to "-" (step S77). Processing then ends.

By performing the processing described above, it is possible for the user to check whether maintenance has really started, and thus it is possible to prevent monitoring from being interrupted by mistake.

Figures 21, 24:
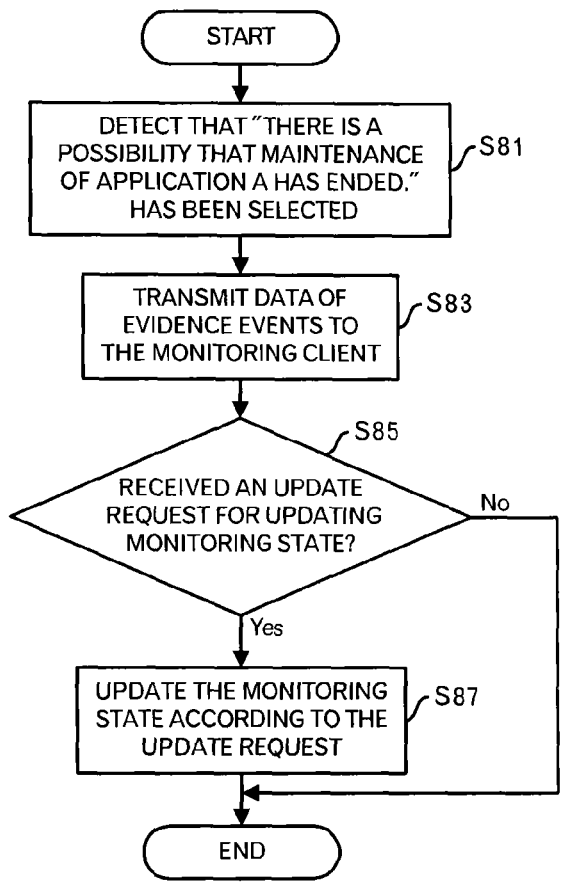
FIG. 21 is a diagram depicting a processing flow of a processing to present data of an evidence event to a user of monitoring client.
FIG. 24 is a diagram depicting an example of data displayed on the display of the monitoring client.

Next, FIG. 21 and FIG. 22 will be used to explain the processing that is performed by the operation maintenance server 1 when the user clicks the left mouse button and selects the portion "There is a possibility that maintenance of application A has ended." in FIG. 16.

The processing unit 31 of the monitoring client 3 detects that the user clicked the left button of the mouse to select the portion "There is a possibility that maintenance of application A has ended." As a result, the processing unit 31 transmits notification data to the operation management server 1 in order to notify that the portion was selected. The notification data includes a number for identifying a combination of evidence events.

The evidence processing unit 115 of the operation management server 1 detects that "There is a possibility that maintenance of application A has ended." has been selected by receiving the notification data from the monitoring client 3 (FIG. 21: step S81).

The evidence processing unit 115 uses a number, which is included in the received notification data for identifying the combination of evidence events, as a key and extracts data of an event from the evidence data storage unit 113. The evidence processing unit 115 then generates display data that includes the extracted data of the event, and transmits that display data to the monitoring client 3 (step S83).

The processing unit 31 of the monitoring client 3 displays the display data, which was received from the operation management server 1, on the display. FIG. 22 illustrates an example of display data that is displayed on the display of the monitoring client 3. In the example in FIG. 22, data of the event, which is the evidence by which it was determined that maintenance of application A ended, is displayed near the message "There is a possibility that maintenance of application A has ended." Moreover, data of events whose number is other than "2" is grayed out, so the user can easily know which portion requires attention by looking at the display.

When the user of the monitoring client 3 determines, after checking the display such as in FIG. 22, that monitoring should be restarted, the user left-clicks the button "restart monitoring" on a display such as in FIG. 20, for example. As a result, the processing unit 31 transmits an update request for updating monitoring state to the operation management server 1. The update request includes a designation of an application for which the monitoring state is to be updated.

Returning to the explanation of FIG. 21, the evidence processing unit 115 determines whether an update request for updating monitoring state was received from the monitoring client 3 (step S85). When an update request for updating monitoring state has not been received (step S85: NO route), processing ends.

On the other hand, when an update request for updating monitoring state has been received (step S85: YES route), the evidence processing unit 115 updates monitoring state of the application, which is specified in the update request, from "-" to "monitoring is in progress" (step S87). Processing then ends.

By performing processing such as described above, it is possible for the user to check whether maintenance has really started, and thus it is possible to prevent monitoring from restarting by mistake.

Figure 23:
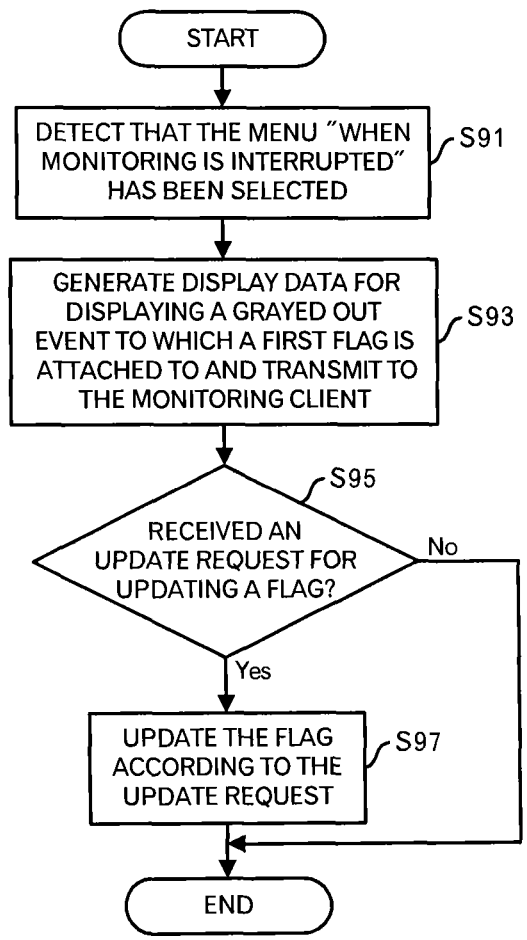
FIG. 23 is a diagram depicting a processing flow of a processing when a user request for display contents in case monitoring is interrupted.

Next, FIG. 23 and FIG. 24 will be used to explain the processing that is performed by the operation management server 1 when the user requests display contents in case monitoring is interrupted.

The user of the monitoring client 3 clicks the left mouse button to select the menu "when monitoring is interrupted" from the menu that is displayed, when the portion "There is a possibility that maintenance of application A has started." is selected by clicking the right mouse button. The processing unit 31 of the monitoring client 3 transmits notification data to the operation management server 1 for notifying that the menu has been selected.

The flag processing unit 121 of the operation management server 1 detects, by receiving the notification data from the monitoring client 3, that the menu "when monitoring is interrupted" has been selected (FIG. 23: step S91).

The flag processing unit 121 extracts data of an event, to which the first flag is attached, from among the data of events that is stored in the event data storage unit 119. And the flag processing unit 121 generates display data including the extracted data which is grayed out, and transmits that display data to the monitoring client 3 (step S93).

The processing unit 31 of the monitoring client 3 displays the display data, which was received from the operation management server 1, on the display. FIG. 24 illustrates an example of display data that is displayed on the display of the monitoring client 3. When compared with FIG. 15, in the example in FIG. 24, data of events that will not be displayed when monitoring is interrupted (in other words, data of events to which the first flag is attached) is grayed out.

When the user of the monitoring client 3 determines, after checking a display such as in FIG. 24, that interrupting the monitoring has not been forgotten for a grayed out application, the user left-clicks the mouse to select the menu "cancel forgotten-to-interrupt" from the menu that is displayed when the portion "There is a possibility that maintenance of application A has started." is selected by right-clicking the mouse. The processing unit 31 transmits an update request for updating a flag to the operation management server 1. The update request includes a specification of the application for which the flag is to be updated.

Returning to the explanation of FIG. 23, the flag processing unit 121 determines whether an update request for updating the flag has been received from the monitoring client 3 (step S95). When an update request for updating a flag has not been received (step S95: NO route), processing ends.

On the other hand, when an update request for updating a flag has been received (step S95: YES route), the flag processing unit 121 updates the flag storage unit 123 so that the first flag that was set for the application specified in the update request is cancelled (step S97). Processing then ends. As a result, the first flag is not attached to the data of an event after the processing in step S97.

By performing the processing described above, it is possible to prevent monitoring from being interrupted when maintenance has not actually started.

Moreover, when the user of the monitoring client 3 left-clicks the menu "delete all" from the menu that is displayed after right-clicking of the mouse to select the portion "There is a possibility that maintenance of application A has started.", the data of events that occurred in a grayed out application may be deleted.

Figure 25:
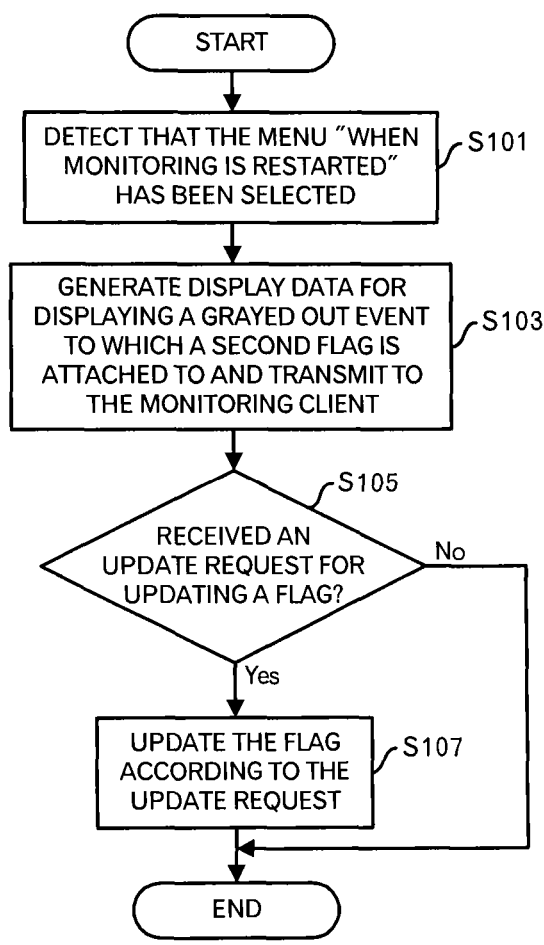
FIG. 25 is a diagram depicting a processing flow of a processing when a user requests for display contents in case monitoring is restarted.

Next, FIG. 25 and FIG. 26 will be used to explain the processing that is performed by the operation management server 1 when the user requests display contents in case monitoring is restarted.

The user of the monitoring client 3 left-clicks the mouse to select the menu "when monitoring is restarted" from the menu that is displayed when the user right-clicks the mouse to select the portion "There is a possibility that maintenance of application A has ended." The processing unit 31 of the monitoring client 3 transmits notification data notifying that the menu has been selected to the operation management server 1.

The flag processing unit 121 of the operation management server 1 detects, by receiving the notification data from the monitoring client 3, that the menu "when monitoring is restarted" is selected (FIG. 25: step S101).

The flag processing unit 121 extracts data of an event, to which the second flag is attached, from among the data of events that is stored in the event data storage unit 119. And the flag processing unit 121 generates display data including the extracted data which is grayed out, and transmits that display data to the monitoring client 3 (step S103). The second flag being attached means that monitoring is not performed for the application in which that event occurred. Therefore, in the stage before step S103, the display data is not displayed on the display of the monitoring client 3.

The processing unit 31 of the monitoring client 3 displays the display data, which was received from the operation management server 1, on the display. FIG. 26 illustrates an example of the display data that is displayed on the display of the monitoring client 3. When comparing the display with that in FIG. 16, in the example in FIG. 26, data of events that is displayed when monitoring is restarted is added. The display of the added event data may be highlighted.

When the user of the monitoring client 3 determines, after checking the display such as in FIG. 26, that restarting the monitoring was not forgotten for that application, the user left-clicks the mouse and selects the menu "cancel forgotten-to-restart" from the menu that is displayed when the portion "There is a possibility that maintenance of application A has ended." is selected by right-clicking of the mouse. As a result, the processing unit 31 transmits an update request for updating a flag to the operation management server 1. The update request includes a specification for that application for which the flag is updated.

Returning to the explanation of FIG. 23, the flag processing unit 121 determines whether an update request for updating a flag was received from the monitoring client 3 (step S105). When an update request for updating a flag has not been received (step S105: NO route), processing ends.

On the other hand, when an update request for updating a flag has been received (step S105: YES route), the flag processing unit 121 updates the flag storage unit 123 so that the second flag is deleted for the application that is specified in the update request (step S107). Processing then ends. As a result, the second flag is not attached to the data of an event after the processing in step S107.

By performing processing such as described above, it is possible to prevent monitoring from being restarted by mistake when maintenance has not actually ended.

Figure 27:
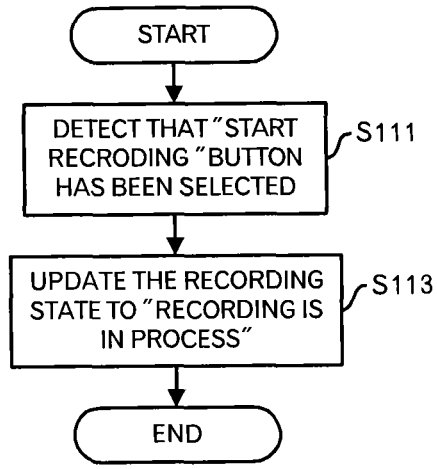
FIG. 27 is a diagram depicting a processing flow of a processing when starting recording.

Next, FIG. 27 will be used to explain the processing that is performed by the operation management server 1 when the user newly defines a starting condition or an ending condition. First, the processing when starting recording will be explained.

The user of the monitoring client 3 clicks the left button of the mouse to select the button "start recording". The processing unit 31 of the monitoring client 3 transmits notification data to the operation management server 1 in order to notify that the button has been selected. The notification data includes a specification for starting or ending maintenance.

After checking that the "start recording" button has been pressed, the user of the monitoring client 3 or the person performing maintenance starts or ends the maintenance of the application.

By receiving the notification data from the monitoring client 3, the recording processing unit 105 of the operation management server 1 detects that the "start recording" button has been selected (FIG. 27: step S111). The recording processing unit 105 stores the received notification data in a storage device such as a main memory.

The recording processing unit 105 updates data, which is stored in the recording state data storage unit 107 and which represents the recording state, from "-" to "recording is in progress" (step S113). Processing then ends.

Figure 28:
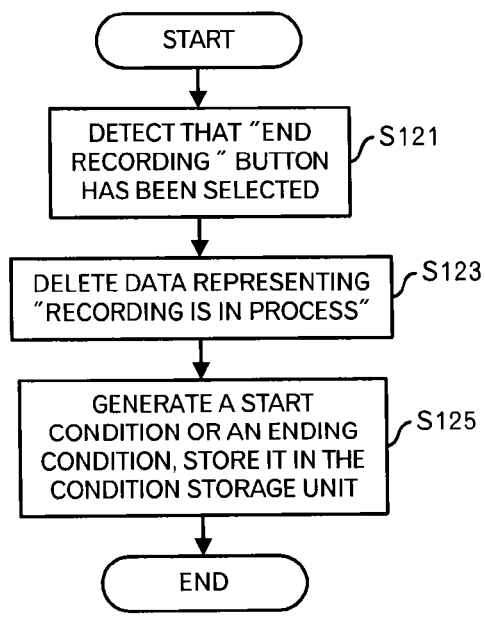
FIG. 28 is a diagram depicting a processing flow of a processing when ending recording.

Next, FIG. 28 is used to explain the processing when ending recording.

When ending recording, the user of the monitoring client 3 left-clicks the mouse to select the "end recording" button. The processing unit 31 of the monitoring client 3 transmits notification data to the operation management server 1 in order to notify that that button was selected.

By receiving the notification data from the monitoring client 3, the recording processing unit 105 of the operation management server 1 detects that the "end recording" button was selected (FIG. 28: step S121).

The recording processing unit 105 deletes data for which "recording is in progress" is displayed, wherein the data is stored in the recording state data storage unit 107 (step S123). And the recording processing unit 105 stores data "-" (in other words, data that represents recording is not in progress).

The recording processing unit 105 uses data of events, which is stored in the recording data storage unit 103, to generate a starting condition or an ending condition according to the specification that is included in the notification data that was received in step S121. And the recording processing unit 105 stores the condition in the condition storage unit 109 (step S125). Processing then ends.

By performing the processing described above, it becomes possible for the user to define under what conditions the maintenance will be regarded to have started or ended. By a user that is actually involved in the maintenance performing this kind of definition, a suitable starting condition or ending condition is recorded in the condition storage unit 109.

Although the embodiments of this invention were explained, this invention is not limited to those. For example, the functional block configurations of the operation management server 1, the monitoring client 3 and the application server 5 do not always correspond to program module configurations.

Moreover, the respective formats of the aforementioned tables are mere examples, and may be changed. Furthermore, as for the processing flow, as long as the processing results do not change, the turns of the steps may be exchanged or the steps may be executed in parallel.

Moreover, instead of step S61, the transmitter 125 may generate display data and transmit the display data to the monitoring client 3 when receiving a request from the monitoring client 3.

Moreover, although the operation management server 1 monitors an error for each application in the example aforementioned above, the operation management server 1 may monitor an error, for example, for each application server 5.

Moreover, in the example aforementioned above, the operation management server 1 generates display data and transmits the display data to the monitoring client 3. However, the monitoring client 3 may receive only the data used for generating display data and generate display data.

Moreover, the timing for the monitoring client 3 to transmit an update request for monitoring state and an update request for a flag to the operation management server 1 is not limited to the timing aforementioned above. Namely, the user of the monitoring client 3 is able to instruct the monitoring client 3 to transmit the update request for monitoring state and a flag to the operation management server 1 in arbitrary timing.

Figure 29:
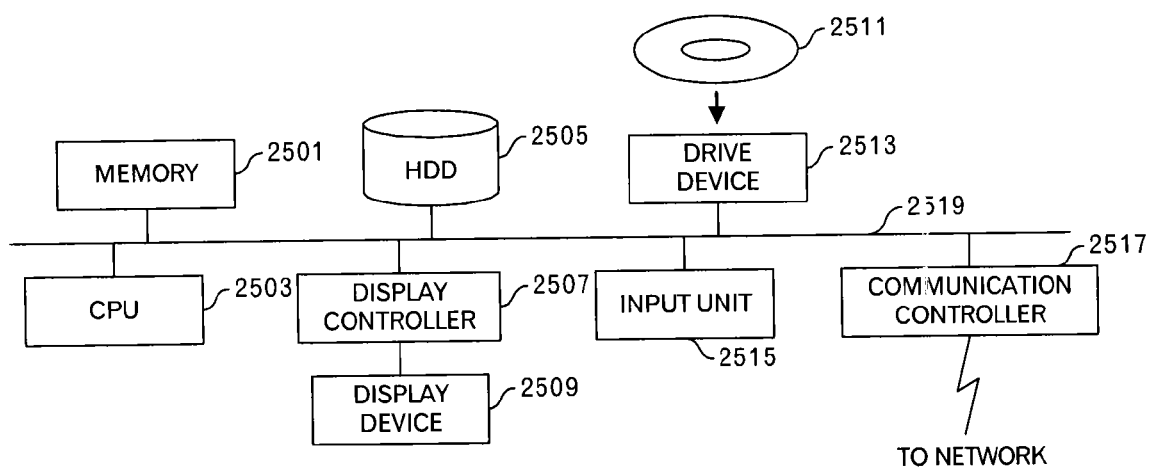
FIG. 29 is a functional block diagram of a computer.

In addition, the aforementioned operation management server 1, monitoring client 3, and the application server 5 are computer devices as illustrated in FIG. 29. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 29. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments of this invention are outlined as follows:

A monitoring method of the embodiments includes (A) detecting an event occurred in a monitoring target; (B) specifying data of an event which corresponds with the detected event, by searching a first storage storing at least data of an event, which occurred when maintenance on the monitoring target started, or data of an event, which occurred when the maintenance on the monitoring target ended; and (C) outputting data indicating that the maintenance on the monitoring target started or ended when data of an event, which corresponds with the detected event, is specified.

By employing the aforementioned configuration, it becomes possible for a user to determine whether an error in the monitoring target occurred due to maintenance or not. Therefore, it is possible for the user to avoid taking unnecessary measures for the error which occurred due to maintenance.

Furthermore, this monitoring method may further include (D) detecting that the event of the specified data corresponds with an event, which occurred when the maintenance on the monitoring target started; (E) determining whether a user is monitoring the monitoring target, by using a second storage storing data indicating whether or not the user is monitoring the monitoring target; and (F) upon determining that the user is monitoring the monitoring target, outputting data indicating that the user forgets to interrupt monitoring of the monitoring target. By employing the aforementioned configuration, it becomes possible to prevent an error from occurring because of forgetting to interrupt.

Furthermore, this monitoring method may further include (G) detecting that the event of the specified data corresponds with an event, which occurred when the maintenance on the monitoring target ended; (H) determining whether a user is monitoring the monitoring target, by using a second storage storing data indicating whether or not the user is monitoring the monitoring target; and (I) upon determining that the user is not monitoring the monitoring target, outputting data indicating that the user forgets to restart monitoring of the monitoring target. By employing the aforementioned configuration, it becomes possible to prevent a user from overlooking an occurrence of an error because of forgetting to restart.

Furthermore, this monitoring method may further include (J) receiving a first request, which requests to present the detected event; and (K) outputting data for presenting the user the detected event. By employing the aforementioned configuration, it becomes possible to the user himself to check whether maintenance really has started or ended.

Furthermore, this monitoring method may further include (L) receiving a second request, which requests to present content in case of interrupting the monitoring, from the user who was notified that the user forgot to interrupt the monitoring; (M) generating list data of events so as to make an event occurred after the detected event occurred identifiable or so as not to include the event occurred after the detected event occurred; and (N) outputting the list data of the events. By employing the aforementioned configuration, it becomes possible for the user to preliminarily check content presented in case of interrupting the monitoring.

Furthermore, this monitoring method may further include (L) receiving a third request, which requests to present content in case of restarting the monitoring, from the user who was notified that the user forgot to restart the monitoring; (M) generating list data of events so as to include the event occurred after the detected event occurred; and (N) outputting the list data of the events. By employing the aforementioned configuration, it becomes possible for the user to preliminarily check content presented in case of restarting the monitoring.

Furthermore, this monitoring method may further include (O) receiving a fourth request, which requests to interrupt or restart the monitoring, from the user to whom the detected event was presented; and (P) changing data indicating whether or not the user is monitoring the monitoring target according to the fourth request, wherein the data is stored in the second storage. By employing the aforementioned configuration, it becomes possible for the user to interrupt or restart monitoring after the user himself checks that maintenance has really started or ended.

Furthermore, this monitoring method may further include (Q) receiving a fifth request, which includes designation of start or end of maintenance and requests to start recording data of an event occurred in the monitoring target; (R) storing data of an event, which occurred in the monitoring target after receiving the fifth request, in a third storage; (S) receiving an sixth request, which requests to end recording data of an event occurred in the monitoring target; (T)

finishing storing data of an event, which occurred in the monitoring target, in the third storage; and (U) storing data of an event, which is stored in the third storage, in the first storage in association with data indicating the designation of start or end of maintenance. By employing the aforementioned configuration, it becomes possible for the user himself to define under what conditions the maintenance will be regarded to have started or ended.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process, the process comprising:
    detecting an event which occurred in a monitoring target;
    specifying data of an event which corresponds with the detected event, by searching a first storage storing at least data of an event, which occurred when maintenance on the monitoring target started, or data of an event, which occurred when the maintenance on the monitoring target ended;
    first outputting data representing that the maintenance on the monitoring target started or ended when data of an event, which corresponds with the detected event, is specified;
    detecting that the detected event corresponds with a first event that occurred when the maintenance on the monitoring target started or a second event that occurred when the maintenance on the monitoring target ended;
    determining whether the monitoring target is being monitored by using a second storage storing data representing whether the monitoring target is being monitored;
    second outputting data representing that a user forgot to interrupt monitoring of the monitoring target in a case of detecting that the detected event corresponds with the first event and determining that the monitoring target is being monitored; and
    third outputting data representing that the user forgot to restart the monitoring of the monitoring target in a case of detecting that the detected event corresponds with the second event and determining that the monitoring target is not being monitored.

2. The computer-readable, non-transitory storage medium as set forth in claim 1, wherein the process further comprising:
    receiving a request to present the detected event; and
    outputting data for presenting the user the detected event.

3. The computer-readable, non-transitory storage medium as set forth in claim 2, wherein the process further comprising:
    receiving a request to interrupt or restart the monitoring from the user to whom the detected event was presented; and
    changing data representing whether the monitoring target is being monitored according to the request from the user, wherein the data is stored in the second storage.

4. The computer-readable, non-transitory storage medium as set forth in claim 1, wherein the second outputting comprising:
    receiving a request to present content in case of interrupting the monitoring from the user who was notified that the user forgot to interrupt the monitoring;
    generating list data of events so as to make an event which occurred after the detected event occurred identifiable or so as not to include the event which occurred after the detected event occurred; and
    outputting the list data of the events.

5. The computer-readable, non-transitory storage medium as set forth in claim 1, wherein the third outputting comprising:
    receiving a request to present content in case of restarting the monitoring from the user who was notified that the user forgot to restart the monitoring;
    generating list data of events so as to include the event which occurred after the detected event occurred; and
    outputting the list data of the events.

6. The computer-readable, non-transitory storage medium as set forth in claim 1, wherein the process further comprising:
    receiving a request including a designation of start or end of maintenance and requests to start recording data of the event which occurred in the monitoring target;
    storing data of an event, which occurred in the monitoring target after receiving the request, in a third storage;
    receiving another request, which requests to end recording the data of the event which occurred in the monitoring target;
    finishing storing data of an event, which occurred in the monitoring target after receiving the another request, in the third storage; and
    storing data of an event, which is stored in the third storage, in the first storage in association with data representing the designation of start or end of maintenance.

7. A monitoring method, comprising:
    detecting, by using a computer, an event which occurred in a monitoring target;
    specifying, by using the computer, data of an event which corresponds with the detected event, by searching a first storage storing at least data of an event, which occurred when maintenance on the monitoring target started, or data of an event, which occurred when the maintenance on the monitoring target ended;
    outputting, by using the computer, data representing that the maintenance on the monitoring target started or ended when data of an event, which corresponds with the detected event, is specified;
    detecting, by using the computer, that the detected event corresponds with a first event which occurred when the maintenance on the monitoring target started or a second event which occurred when the maintenance on the monitoring target ended;

determining whether the monitoring target is being monitored by using the computer and a second storage storing data representing whether the monitoring target is being monitored;

outputting, by using the computer, data representing that a user forgot to interrupt monitoring of the monitoring target in a case of detecting that the detected event corresponds with the first event and determining that the monitoring target is being monitored; and outputting, by using the computer, data representing that the user forgot to restart the monitoring of the monitoring target in a case of detecting that the detected event corresponds with the second event and determining that the monitoring target is not being monitored.

8. A monitoring apparatus, comprising:

a memory; and a processor configured to use the memory and execute a process, the process comprising detecting an event which occurred in a monitoring target;

specifying data of an event which corresponds with the detected event, by searching a first storage storing at least data of an event, which occurred when maintenance on the monitoring target started, or data of an event, which occurred when the maintenance on the monitoring target ended;

outputting data representing that the maintenance on the monitoring target started or ended when data of an event, which corresponds with the detected event, is specified;

detecting that the detected event corresponds with a first event which occurred when the maintenance on the monitoring target started or a second event which occurred when the maintenance on the monitoring target ended;

determining whether the monitoring target is being monitored by using a second storage storing data representing whether the monitoring target is being monitored;

outputting data representing that a user forgot to interrupt monitoring of the monitoring target in a case of detecting that the detected event corresponds with the first event and determining that the monitoring target is being monitored; and outputting data representing that the user forgot to restart the monitoring of the monitoring target in a case of detecting that the detected event corresponds with the second event and determining that the monitoring target is not being monitored.

\* \* \* \* \*